United States Patent [19]
Vircks

[11] Patent Number: 6,141,880
[45] Date of Patent: Nov. 7, 2000

[54] TOOL FOR LAYOUT OF RAPID DEVELOPMENT ANTENNA ARRAY

[75] Inventor: Bradley J. Vircks, Cedar Rapids, Iowa

[73] Assignee: Rockwell Collins, Inc., Cedar Rapids, Iowa

[21] Appl. No.: 09/052,368

[22] Filed: Mar. 31, 1998

[51] Int. Cl.[7] .......................... G01C 15/12; G01C 17/04; A63C 19/06
[52] U.S. Cl. ............................... 33/1 G; 33/354; 33/413; 33/339
[58] Field of Search .................................... 33/1 G, 1 CC, 33/333, 354, 413, 755, 756, 759, 349, 351, 352, 347, 339

[56] References Cited

U.S. PATENT DOCUMENTS

| | | | |
|---|---|---|---|
| 464,205 | 12/1891 | Swope | 33/756 |
| 3,668,781 | 6/1972 | Teter | 33/755 |
| 3,871,108 | 3/1975 | Beaudout | 33/349 |
| 5,107,595 | 4/1992 | Stay et al. | 33/1 G |
| 5,371,949 | 12/1994 | Delaurier | 33/1 G |

*Primary Examiner*—Christopher W. Fulton
*Attorney, Agent, or Firm*—Nathan O. Jensen; Kyle Eppele; James P. O'Shaughnessy

[57] ABSTRACT

A tool for laying out a pattern of a measured size and orienting the pattern with respect to an exterior point of reference is disclosed. A cord having a plurality of anchoring points spaced along its length is arrayed to form the pattern. A direction finding device orients the pattern formed by the cord to a point of reference exterior to the pattern. Anchoring devices anchor each anchoring point of the cord to a surface so that the cord is held to the surface in the shape of the pattern. The cord is attached to a spool which stows the cord, anchoring devices, and direction finding device when not deployed.

12 Claims, 6 Drawing Sheets

TOOL FOR LAYOUT OF RAPID DEVELOPMENT ANTENNA ARRAY

BACKGROUND OF THE INVENTION

The present invention relates to an apparatus for laying out a pattern having of a measured size, and more particularly to a tool for layout of a rapid deployment antenna array.

Rapid deployment antenna arrays may be used in remote areas where a more permanent antenna array is not available. For example, a rapid deployment antenna array may be used for pseudo-Doppler HF direction finding by Special Forces units of the Armed Forces. For a rapid deployment antenna array to function properly, each antenna of the array must be precisely positioned with respect to the other antennas of the array. Additionally, it may be necessary to orient the entire antenna array with respect to an exterior point of reference. For example, if the antenna array is utilized as part of a direction finding system, it may be necessary to orient the array with respect to true north so that the direction finding system may function at its maximum efficiency.

Precise positioning and orientation of the antenna array may prove difficult in remote locations or under exigent circumstances where surveying equipment may be unavailable or unusable. In these situations, positioning and orientation of the antennas of the array may only be accomplished by estimation, or by laying the antennas of the array out according to a predefined pattern measured on the ground. However, a typical antenna array may occupy a substantial area so that laying out such a pattern may be difficult and time consuming.

Consequently, it would be advantageous to provide an apparatus for efficiently laying out a pattern of a measured size and orienting the pattern with respect to an exterior point of reference.

SUMMARY OF THE INVENTION

Accordingly, the present invention provides a novel apparatus for laying out a pattern of a measured size and orienting the pattern with respect to an exterior point of reference. The apparatus comprises a cord having a plurality of anchoring points spaced along its length. A direction finding device is attached to the cord. The direction finding device may be used to orient a pattern formed by the cord to a point of reference exterior to the pattern. Anchoring devices secure each anchoring point of the cord to a surface, such as the ground, so that the cord is held to the surface in the shape of the pattern. The cord is attached to a spool which stows the cord, anchoring devices, and direction finding device when they are not deployed so that the tool may be conveniently carried from place to place by a user.

It is to be understood that both the foregoing general description and the following detailed description are exemplary and explanatory only and are not restrictive of the invention claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
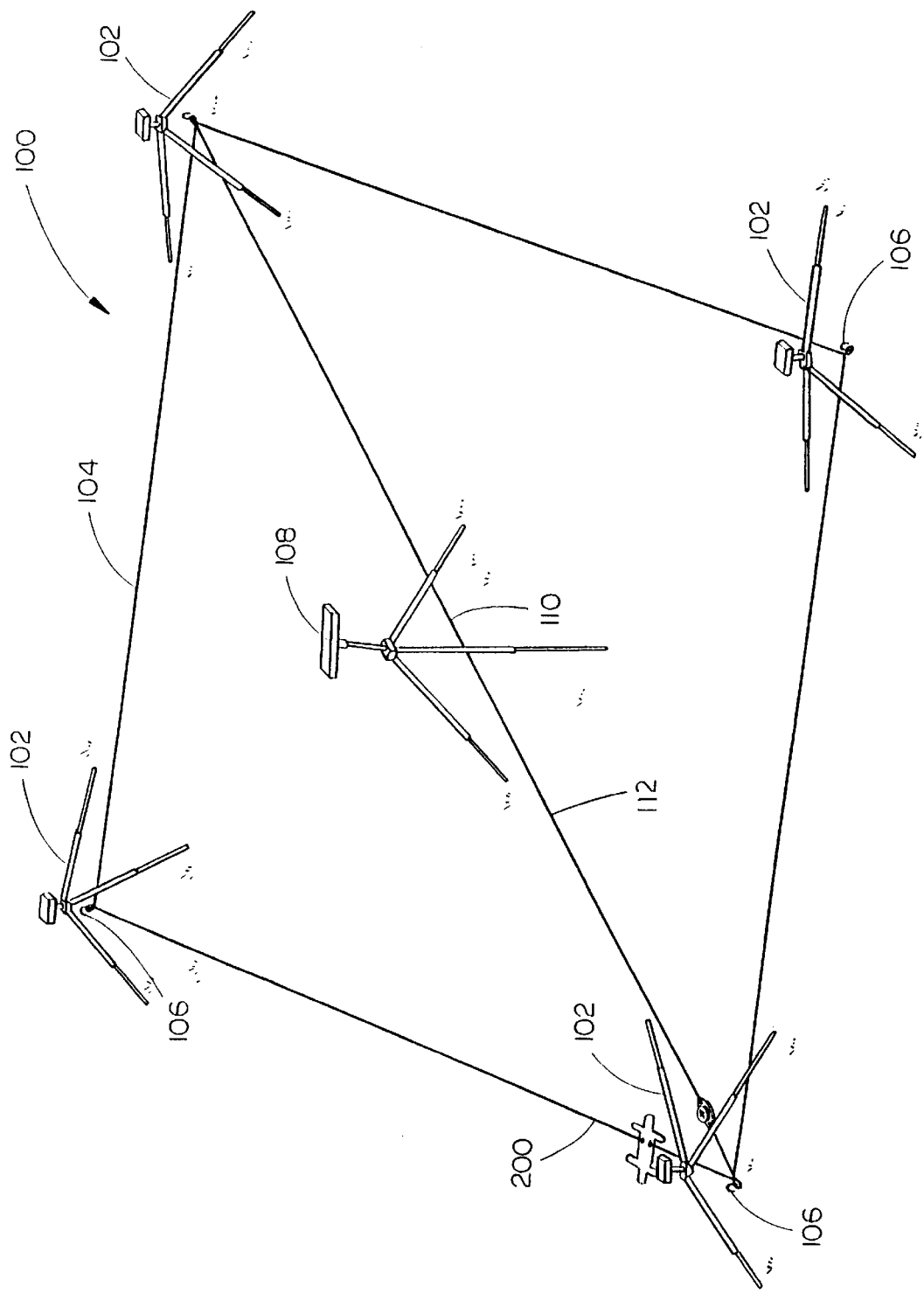
FIG. 1 is an isometric view of a rapid deployment antenna array utilizing the tool of the present invention for laying out a pattern of measured size and orienting the pattern with respect to an exterior point of reference.

Referring now to FIG. 1, a rapid deployment antenna array is shown. The rapid deployment antenna array 100 may be used in remote areas where a more permanent antenna array is not available. Typically, each antenna 102 of the antenna array 100 must be precisely positioned with respect to the other antennas 102 of the array 100 so that the antenna array 100 may function properly. Additionally, it may be necessary to orient the antenna array 100 with respect to an exterior point of reference so that the antenna array 100 may function at its maximum efficiency. As shown in FIG. 1, the antenna array 100 may utilize four antennas 102 deployed in a square pattern 104 of a measured size wherein an antenna 102 is positioned over each corner 106 of the pattern 104. A device 108 such as an additional antenna, a receiver, a controller or a solar panel array may be positioned at the center 110 of the pattern 104. The pattern 104 may be oriented with respect to an exterior point of reference such as, for example, true north. This may be accomplished by orienting a diagonal 112 of the pattern 104 with respect to the local lines of magnetic flux that make up the earth's magnetic field and adjusting this orientation for local declination. (i.e., the local deviation of a magnetic north indication from true north).

Figure 2:
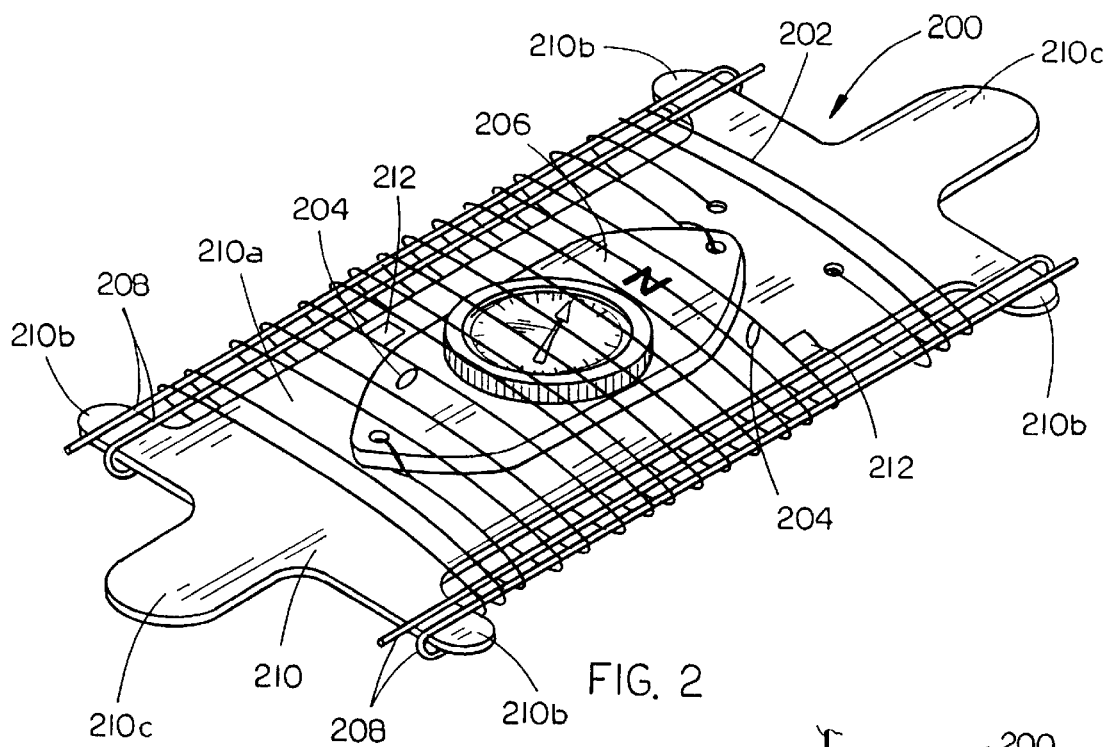
FIG. 2 is an isometric view of the tool shown in FIG. 1, wherein the cord, anchoring devices, and direction finding device are shown in a stowed position.
Figure 4:
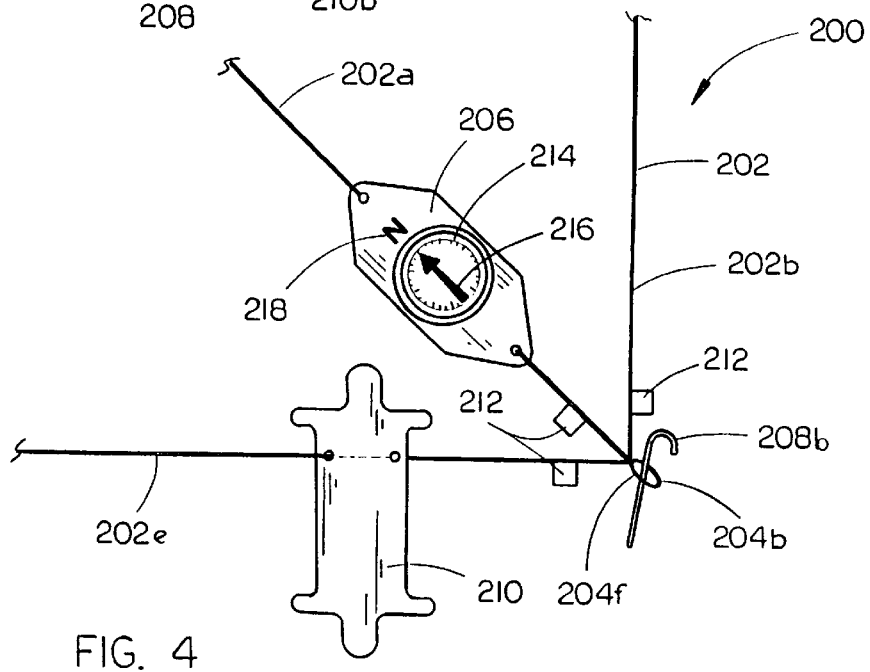
FIG. 4 is a top plan view illustrating detail of the south corner of the pattern shown in FIG. 3.
Figure 3:
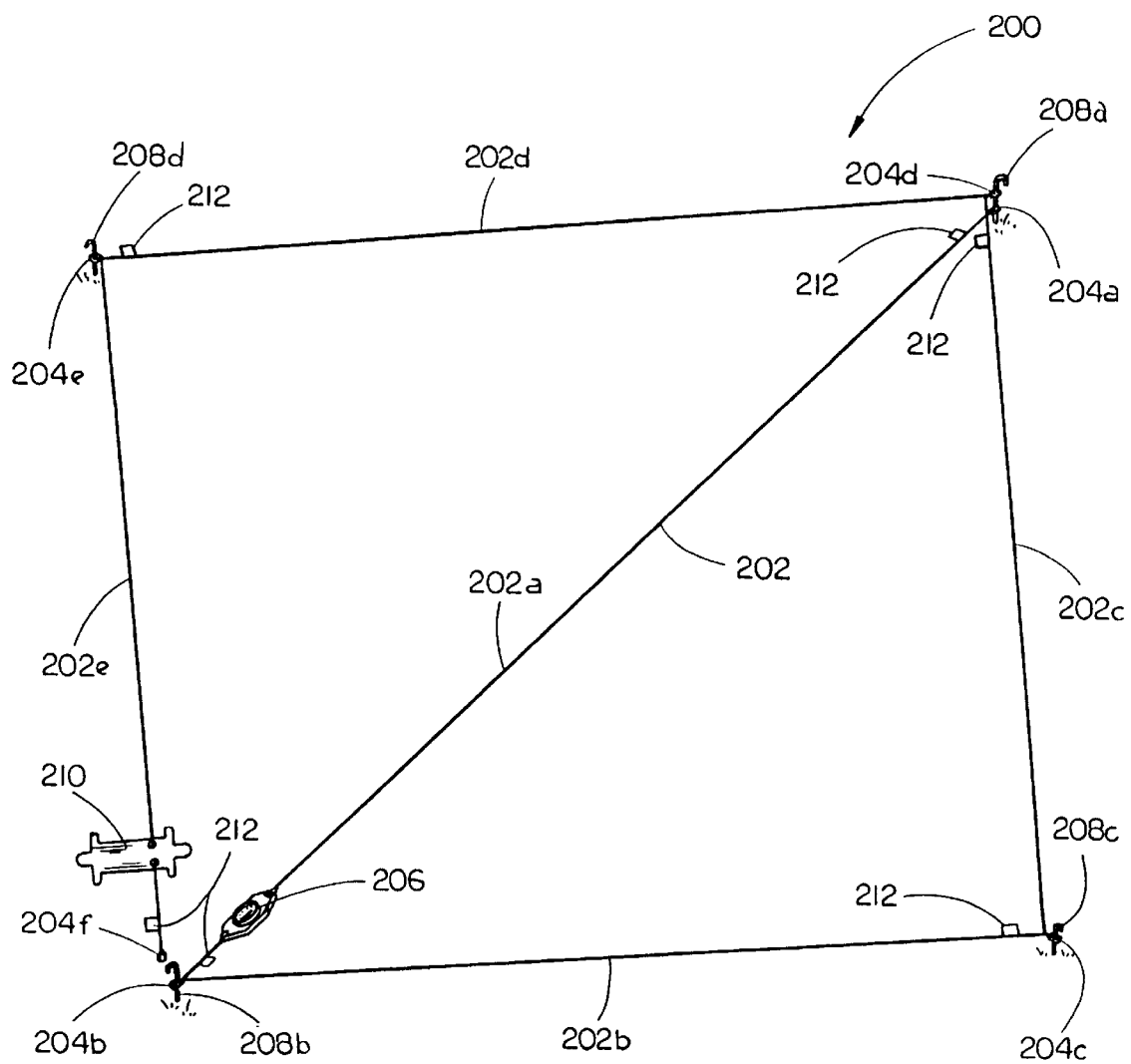
FIG. 3 is an isometric view of the tool shown in FIG. 1, wherein the cord has been arrayed to form a rectangular pattern having a measured size.

The present invention, according to the embodiment shown in FIGS. 1 through 4, provides a tool 200 for efficiently laying out a square pattern 104 on which the antenna array 100 may be erected and orienting the pattern 104 to an exterior point of reference. As shown in FIGS. 2, 3 and 4, the tool 200 preferably comprises a cord 202 having a measured length. The cord 202 may be arrayed on a surface, such as the ground, to form the square pattern 104 required to position and orient the antennas 102 of the antenna array 100 shown in FIG. 1. Preferably, the cord 202 is made of a material which is resistant to stretching so that the pattern formed by the cord 202 is dimensionally stable. A plurality of anchoring points 204 may be spaced along the length of the cord 202. Anchoring devices 208 may engage the cord 202 via each of the anchoring points 204 to secure the cord 202 to a surface such as the ground. Preferably, the anchoring points 204 comprise loops 204a, 204b, 204c, 204d, 204e & 204f formed in the cord 202 at specific predetermined intervals along the length of the cord 202. Similarly, the anchoring devices 208 may comprise stakes 208a, 208b, 208c & 208d having a curved upper end and a shaft which may be driven into the ground by a user. Preferably, the stakes 208a, 208b, 208c & 208d are made of a non-magnetic material such as, for example, brass, aluminum, plastic, or a composite. Each of the loops 204a, 204b, 204c, 204d, 204e & 204f may be placed around the curved upper end of a specific one of the stakes 208a, 208b, 208c & 208d to secure the cord to the ground. A tab 212 may be affixed to the cord 202 adjacent to each loop 204a, 204b, 204c, 204d, 204e & 204f to, for example, identify the loop and inform the user which stake that loop is to be placed around to properly array the cord 202 in the shape of the pattern.

A direction finding device 206 may provided for orienting the pattern formed by the cord 202 with respect to an exterior point of reference. As shown in FIG. 4, the direction finding device 206 may comprise a magnetic compass 214 for orienting the pattern formed by the cord 202 to magnetic north (i.e., orienting the pattern with respect to the local lines of magnetic flux that make up the earth's magnetic field). This orientation may be adjusted for local declination to orient the pattern with respect to true north. Alternatively, the direction finding device 206 include a sighting device, for example, for aligning the pattern formed by the cord 202 with a landmark such as a building, mountain, sign, etc. Preferably, the direction finding device 206 is attached to the cord 202 to prevent it from being misplaced or lost.

A spool 210 may be attached to the cord 202 for receiving the cord 202, direction finding device 206 and anchoring devices 208 so that the tool 200 may be self stowed. As shown in FIG. 2, the cord 202 may be wrapped around the spool 210 when not arrayed in the pattern. The direction finding device 206 and anchoring devices 208 may be captured against the spool 210 by the cord 202 so that the tool 200 may be conveniently stowed for transport from place to place. The spool 210 preferably comprises a cord receiving portion 210a on which the cord 202 may be wrapped. Flange portions 210b may extend outwardly from each end of the cord receiving portion 210a. The flange portions 210b guide the cord 202 onto the cord receiving portion 210 and prevent the cord 202 from coming unwrapped from the spool 210 while the tool 200 is stowed. The flange portions 210b may also cooperate to receive the anchoring devices 208 so that they may be captured against the spool 210 as the cord 202 is wound thereon. A grasping portion 210c may extend outwardly from the ends of the spool 210. A user may hold the spool 210 by the grasping portion 210c so that the cord 202 may be wound onto or off of the cord receiving portion 210a.

Referring now to FIGS. 3 and 4, the cord is shown deployed for laying out a square pattern of a measured size wherein the pattern is oriented to an exterior point of reference. Preferably, the overall length of the cord 202 and the distance between loops 204a, 204b, 204c, 204d, 204e & 204f is such that when the cord 202 is anchored to the ground via the stakes 208a, 208b, 208c & 208d in the predetermined pattern and oriented with respect to true north, a square of fixed size and orientation is established on which the antennas 102 of the antenna array 100 shown in FIG. 1 may be erected.

As shown in FIG. 3, the cord 202 may have six loops: a first loop 204a, a second loop 204b, a third loop 204c, a forth loop 204d, a fifth loop 204e, and a sixth loop 204f. The loops 204a, 204b, 204c, 204d, 204e & 204f may be spaced along the cord 202 so that the cord 202 is partitioned into a diagonal length 202a, extending between the first loop 204a and the second loop 204b, and four equal side lengths 202b, 202c, 202d & 202e, extending between the second loop 204b, third loop 204c, forth loop 204d, fifth loop 204e, and sixth loop 204f, respectively. Preferably, the diagonal length 202a is proportioned to the side lengths 202b, 202c. 202d & 202e according to the Pythagorean theorem (e.g., the square of the diagonal length 202a is equal to the twice the square of a side length 202b, 202c. 202d & 202e) so that the cord 202 may be arrayed in a square pattern having sides equal to the side lengths 202b, 202c, 202d & 202e and a diagonal equal to the diagonal length 202a.

As shown in FIGS. 3 and 4, the direction finding device 206 and spool 210 may be attached to the cord 202 at specific points along its length relative to the loops to facilitate quick and accurate deployment of the cord 202 in the pattern and efficient stowage of the cord on the spool 210. Preferably, the direction finding device 206 is attached to the diagonal length 202a of the cord 202 near the second loop 204b. Similarly, the spool 210 may be attached to a side length 202e of the cord 202 near the sixth loop 204f.

Deployment of the cord 202 in the square pattern shown in FIGS. 1 and 3 may be accomplished by first using the direction finding device 206 to establish a rough orientation of the deployment site (e.g., determine north, south, east and west directions from the compass 214). The four anchoring stakes 208a, 208b, 208c & 208d may be removed from the spool 210 by sliding them from beneath the cord 202. Preferably, one of the stakes 208a is then driven into the ground at a position where the north corner of the square pattern will be positioned. The first loop 204a is placed over this stake 208a. The diagonal length 202a of the cord 202 may then be unwound from the spool 210 as the user moves southward until the direction finding device 206 and second loop 204b are free from the spool 210. The user may then pull the diagonal length 202a of the cord 202 free of slack and use the compass 214 to orient the diagonal length 202a with respect to magnetic north. The orientation of the diagonal length 202a may then be adjusted for local declination. A stake 208b may be placed into the second loop 204b and driven into the ground while the diagonal length 202a is held taut as oriented to define the south corner of the square pattern. Alternatively, the second loop 204b may be placed over the stake 208b after it is driven into the ground.

As shown in FIG. 4, orientation of the diagonal length 202a relative to magnetic north may be accomplished by aligning the magnetic needle or pointer 216 of the compass with indicia 218 (e.g., an "N" or a line) disposed on the upper surface of the direction finding device 206. Further, the compass 214 may be positioned so that the magnetic needle 216 will also be aligned with the diagonal length 202a of the cord 202 when the pattern is properly oriented with magnetic north. This orientation may be adjusted for local declination so that the diagonal length 202a may be oriented with respect to true north.

The east and west corners of the square pattern may now be located. The user may move in a north-easterly direction at an angle of approximately 45 degrees to the diagonal length 202a. Preferably, the first side length 202b of the cord 202 is unwound from the spool 210 and allowed to lie loosely on the ground at an approximate 45 degree angle to the diagonal length 202a. When the third loop 204c is reached and unwound, the user may turn and move toward the north corner of the pattern. The second side length 202c of the cord 202 is unwound from the spool 210 and allowed to lie loosely on the ground until the forth loop 204d is reached. The fourth loop 204d may be placed over the stake 208a driven into the ground at the north corner of the pattern. The user may then move in a south-westerly direction at an angle of approximately 45 degrees to the diagonal length 202a. The third side length 202d of the cord 202 is unwound from the spool 210 and allowed to lie loosely on the ground at an approximate 45 degree angle to the diagonal length 202a. When the fifth loop 204e is reached and unwound, the user may turn and move toward the south corner of the pattern. The fourth side length 202e of the cord 202 is unwound from the spool 210 and allowed to lie loosely on the ground until the sixth loop 204f is reached and unwound. The sixth loop 204f may be placed over the stake 208b driven into the ground at the south corner of the pattern. The third loop 204c may then be drawn to the east so that there is no slack in the first and second side lengths 202b & 202c of the cord 202. A stake 208c may be placed in the third loop 204c and driven into the ground while the side lengths 202b & 202c are held taut to define the east corner of the square pattern. Alternatively, the third loop 204c may be placed over the stake 208c after it is driven into the ground. Similarly, the fifth loop 204e may be drawn to the west so that there is no slack in the third and fourth side lengths 202d & 202e of the cord 202. A stake 208d may be placed in the fifth loop 204e and driven into the ground while the side lengths 202d & 202e are held taut to define the west corner of the square pattern. Alternatively, the fifth loop 204e may be placed over the stake 208d after it is driven into the ground. Preferably, the side lengths 202b, 202c, 202d & 202e of the cord 202 define a square pattern on the ground which has a diagonal oriented relative to the magnetic field of the earth. This orientation may be adjusted for local declination. An antenna 102 of the antenna array 100 shown in FIG. 1 may be positioned over each corner of the pattern. The tool 200 may self stow to be more easily transported from place to place. This may be accomplished by pulling the four stakes 208a, 208b, 208c & 208d from the ground and laying them along the length of the spool 210. The cord 202 may then be wound onto the spool 210 from the sixth loop 204f to the second loop 204b, capturing the stakes 208a, 208b, 208c & 208d against the spool 210. The direction finding device 206 may then placed onto the spool 210 so that the remaining cord, from the direction finding device to the first loop 204a may be wound onto the spool 210 capturing the direction finding device 206.

The embodiment of the invention shown in FIGS. 1 through 4, is adapted to form a square (i.e., a rectangle having all four sides of equal length) pattern when deployed. However, the tool of the present invention may be modified to form any quadrilateral (i.e., a polygon having four sides such as a parallelogram, rectangle, or the like) pattern when deployed by varying the length of one or more of the side lengths 204a, 204b, 204c & 204d.

Figure 5:
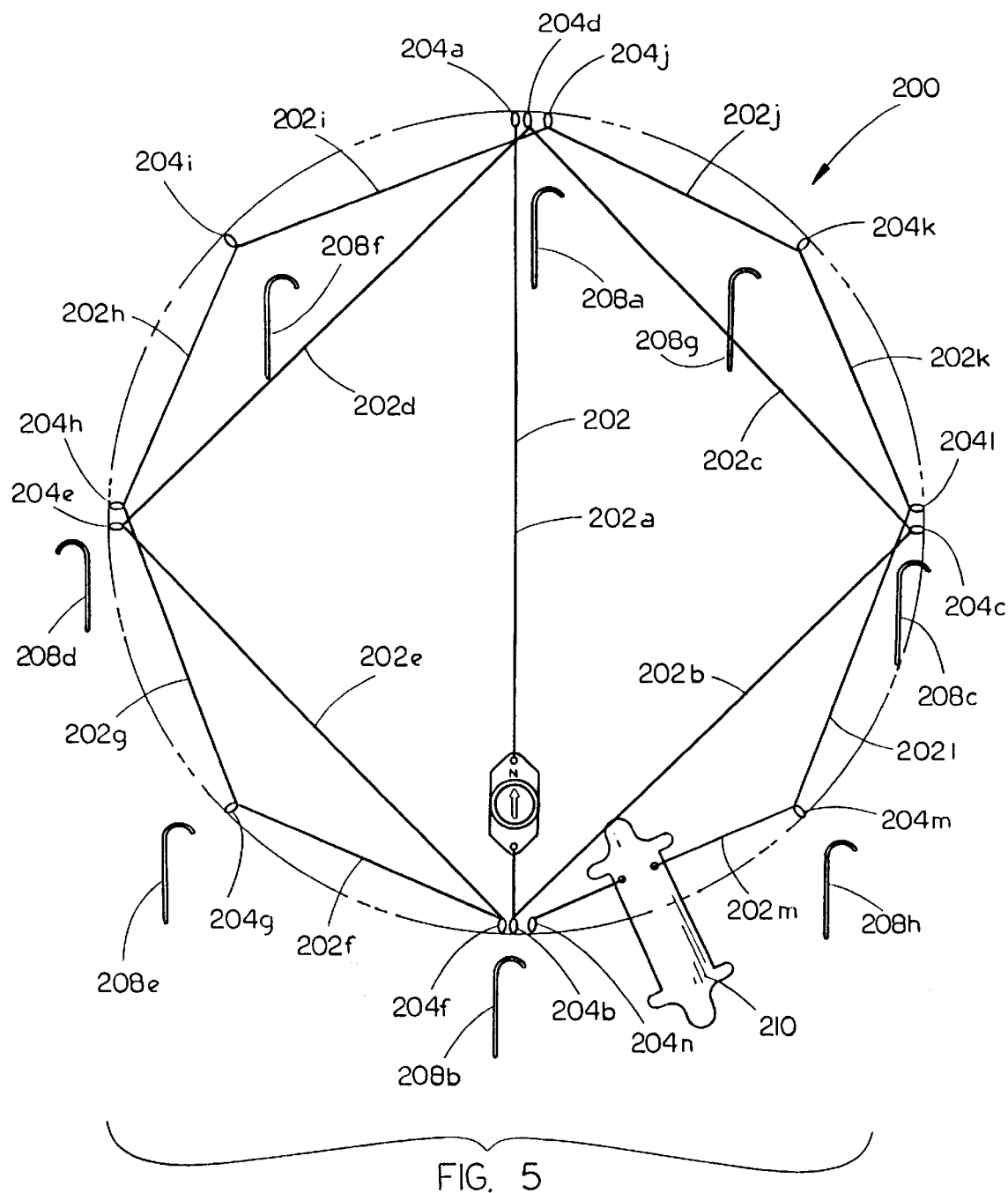
FIG. 5 is a top plan view of the tool of the present invention wherein the cord is arrayed to form an octagonal pattern having a measured size.

Referring now to FIG. 5, it may be desirable to have more than four antennas in an antenna array. The tool 200 of the present invention may be modified to form any polygonal pattern having a number of corners corresponding to the number of antennas in the array to be erected. For example, as shown in FIG. 5, the tool 200 may be modified to form an octagonal pattern having a measured size. This is accomplished by lengthening the cord 202 so that it may have an additional eight loops: a seventh loop 204g, an eighth loop 204h, a ninth loop 204i, a tenth loop 204j, an eleventh loop 204k, a twelfth loop 204l, a thirteenth loop 204m, and a fourteenth loop 204n. These loops 204g, 204h, 204i, 204j, 204k, 204l, 204m & 204n may be spaced along the cord 202 so that the additional length of the cord 202 is partitioned into eight octagon side lengths 202f, 202g, 202h, 202i, 202j, 202k, 202l, & 202m. The octagon side lengths 202f, 202g, 202h, 202i, 202j, 202k, 202l, & 202m may be of equal length (shown) or may be of unequal lengths (not shown) as required by the particular pattern to be formed. Preferably, the spool 210 is attached to a side length 202m of the cord 202 near the fourteenth loop 204n. Four additional stakes 208e, 208f, 208g & 208h are utilized. These stakes 208e, 208f, 208g & 208h are placed at, and used to locate, the southwest, northwest, northeast, and southeast corners of the octagonal pattern, respectively, when the cord 202 is oriented with respect to magnetic north.

Deployment of the cord 202 in the octagonal pattern shown in FIG. 5 may be accomplished by first laying out a square pattern as described in the discussion of FIGS. 1 through 4, orienting the pattern with respect to magnetic north, and adjusting the orientation of the pattern for local declination. From the south corner of the square pattern, the user may move in a northwesterly direction toward the west corner of the square pattern. Preferably, the first octagon side length 202f and the second octagon side length 202g of the cord 202 are unwound from the spool 210 and allowed to lie loosely on the ground along the fourth side length 202e. When the eighth loop 204h is reached and unwound, it is placed over the stake 208d driven into the ground at the west corner of the pattern. The user may turn and move in a northeasterly direction toward the north corner of the pattern. The third octagon side length 202h and the fourth octagon side length 202i of the cord 202 are unwound from the spool 210 and allowed to lie loosely on the ground along the third side length 202d. When the tenth loop 204j is reached and unwound, it is placed over the stake 208a driven into the ground at the north corner of the pattern. The user may then move in a southeasterly direction toward the east corner of the pattern. The fifth octagon side length 202j and the sixth octagon side length 202k of the cord 202 are unwound from the spool 210 and allowed to lie loosely on the ground along the second side length 202c. When the twelfth loop 204l is reached and unwound, it is placed over the stake 208c driven into the ground at the east corner of the pattern. The user may turn and move in a southwesterly direction toward the south corner of the pattern. The seventh octagon side length 202l and the eighth octagon side length 202m of the cord 202 are unwound from the spool 210 and allowed to lie loosely on the ground along the first side length 202b. When the fourteenth loop 204n is reached and unwound, it is placed over the stake 208b driven into the ground at the south corner of the pattern. The seventh loop 204g may then be drawn to the southwest so that there is no slack in the first and second octagon side lengths 202f & 202g of the cord 202. A stake 208e may be placed in the seventh loop 204g and driven into the ground while the first and second octagon side lengths 202f & 202g are held taut to define the southwest corner of the octagonal pattern. Alternatively, the seventh loop 204g may be placed over the stake 208e after it is driven into the ground. The ninth loop 204e may be drawn to the northwest so that there is no slack in the third and fourth octagon side lengths 202h & 202i of the cord 202. A stake 208f may be placed in the ninth loop 204i and driven into the ground while the third and fourth octagon side lengths 202h & 202i are held taut to define the northwest corner of the octagonal pattern. Alternatively, the ninth loop 204i may be placed over the stake 208f after it is driven into the ground. The eleventh loop 204k may then be drawn to the northeast so that there is no slack in the fifth and sixth octagon side lengths 202j & 202k of the cord 202. A stake 208g may be placed in the eleventh loop 204k and driven into the ground while the fifth and sixth octagon side lengths 202j & 202k are held taut to define the northeast corner of the octagonal pattern. Alternatively, the eleventh loop 204k may be placed over the stake 208g after it is driven into the ground. The thirteenth loop 204m may be drawn to the southeast so that there is no slack in the seventh and eighth octagon side lengths 202l & 202m of the cord 202. A stake 208h may be placed in the thirteenth loop 204m and driven into the ground while the seventh and eighth octagon side lengths 202l & 202m are held taut to define the southeast corner of the octagonal pattern. Alternatively, the thirteenth loop 204m may be placed over the stake 208h after it is driven into the ground. Preferably, the octagon side lengths 202f, 202g, 202h, 202i, 202j, 202k, 202l, & 202m of the cord 202 define an octagonal pattern on the ground which is oriented relative to the magnetic field of the earth. This orientation may be adjusted for local declination. An antenna of an antenna array may be positioned over each corner of the pattern.

The tool 200, shown in FIG. 5, may self stow to be more easily transported from place to place. This may be accomplished by pulling the eight stakes 208a, 208b, 208c, 208d, 208e, 208f, 208g & 208h from the ground and laying them along the length of the spool 210. The cord 202 may then be wound onto the spool 210 from the fourteenth loop 204n to the second loop 204b, capturing the stakes 208a, 208b, 208c, 208d, 208e, 208f, 208g & 208h against the spool 210. The direction finding device 206 may then placed onto the spool 210 so that the remaining cord, from the direction finding device to the first loop 204a may be wound onto the spool 210 capturing the direction finding device 206.

Figure 6:
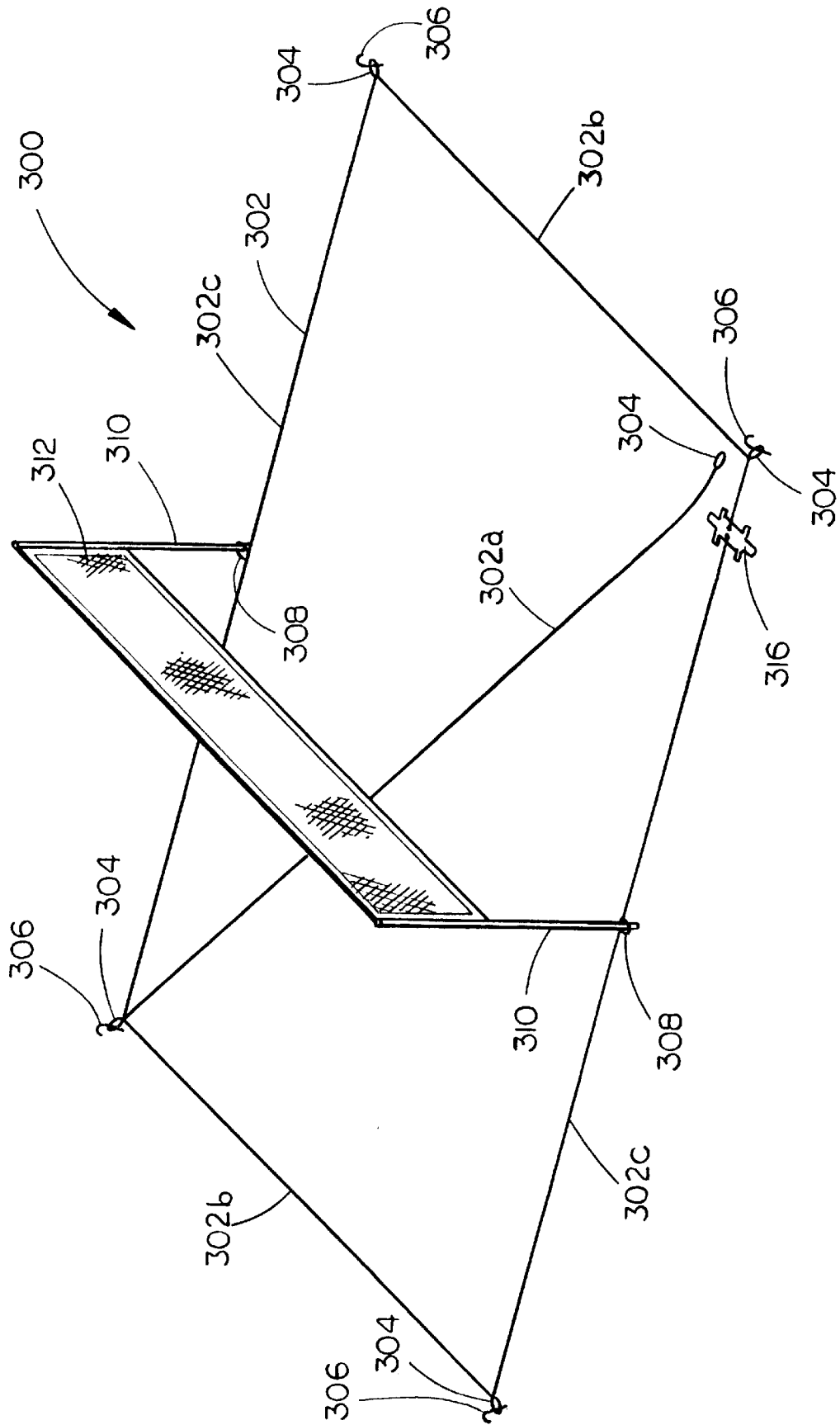
FIG. 6 is an isometric view illustrating an alternative embodiment of the present invention used to layout a volleyball or badminton court.
Figure 7:
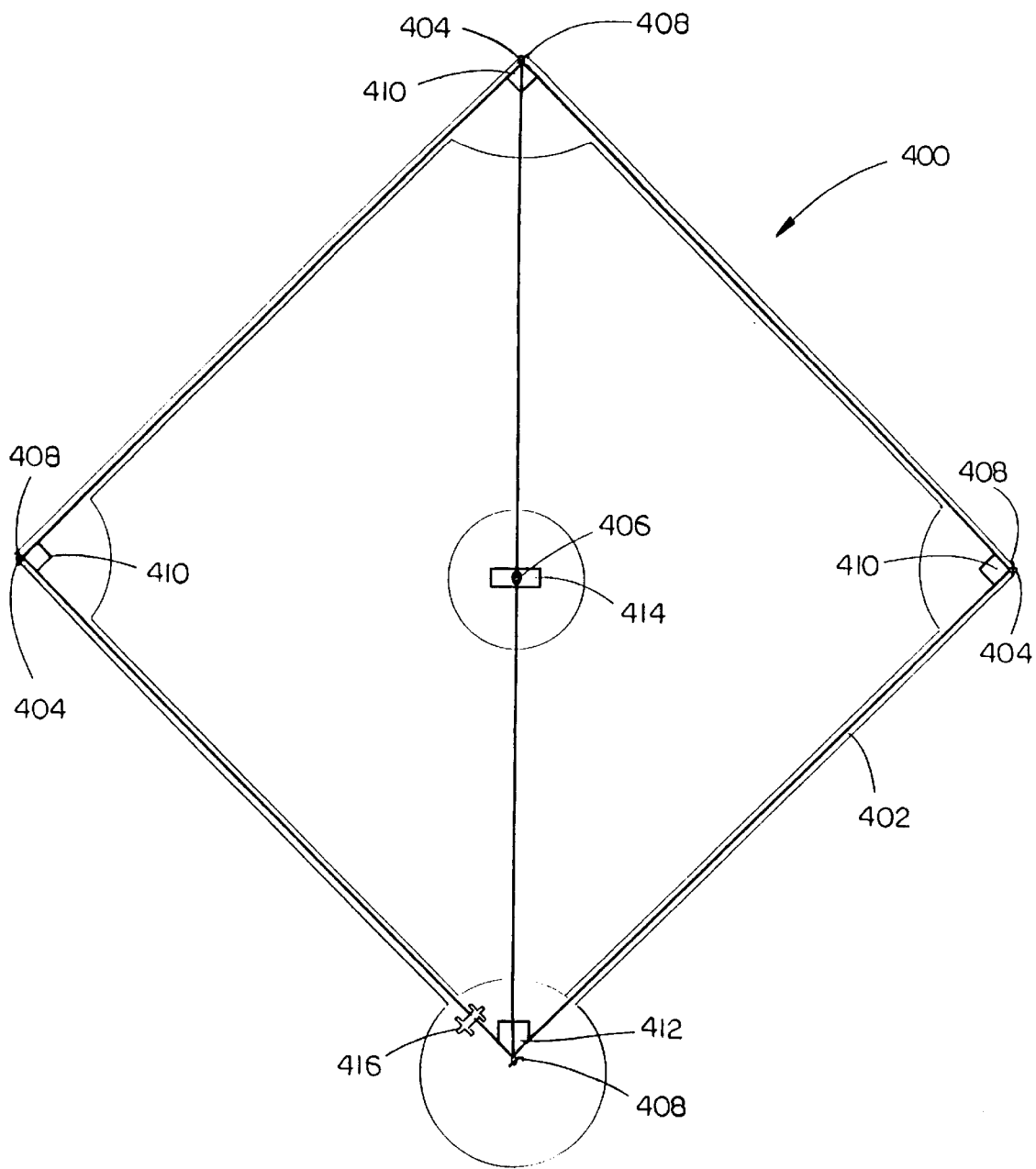
FIG. 7 is a top plan view illustrating an alternative embodiment of the present invention used to layout a baseball diamond.

Referring now to FIGS. 6 and 7, the tool may be adapted for laying out the playing surface of an outdoor game such a volleyball, badminton, baseball, softball or the like.

As shown in FIG. 6, the tool may be used to lay out a volleyball or badminton court. This embodiment of the tool, which will herein be referenced generally as 300, comprises a cord 302 having a specific measured length for forming a rectangular pattern having the size and shape of a volleyball or badminton court. Preferably, the cord 302 is resistant to stretching so that the pattern formed by the cord 302 is dimensionally stable. A plurality of anchoring points 304 may be spaced along the length of the cord 302. Anchoring devices 306 may engage the cord 302 via each of the anchoring points 304 to secure the cord 302 to a surface wherein the cord 302 forms the outline of the volleyball or badminton court. Preferably, the anchoring points 304 comprise loops formed in the cord 302 at specific pre-measured intervals along the cord 302. Similarly, the anchoring devices 308 preferably comprise stakes which may be driven into the ground. Each of the loops may then be placed around one of the stakes to secure the cord to the ground.

The cord 302 may have four anchoring points 304 spaced along its length which partition the cord 302 into a diagonal length 302a, two end lengths 302b, and two side lengths 302c. Preferably, the diagonal length 302a is proportioned to the side lengths 302b & 302c by the Pythagorean theorem (e.g., the square of the diagonal length 202a is equal to the sum of the square of the end length 302b and the side length 302c) so that when the cord 302 is deployed it forms a rectangular pattern having square corners. Once deployed the diagonal length 302a may be removed from the playing surface of the court to that it does not interfere with playing of the game. Loops 308 may be formed in the cord at the center points of the side lengths 302d. These loops 308 locate the position where poles 310 supporting the volleyball or badminton net 312 are to be positioned in the ground. A spool 316 may be attached to the cord 302, near one end thereof, for receiving the cord 302 so that the tool 300 may be self stowed. To stow the cord and anchoring devices 306, a user may lay the anchoring devices 306 along the length of the spool 316. The cord 302 may then be wound onto the spool 316 capturing the anchoring devices 306 against the spool 316.

As shown in FIG. 7, the tool may be used to lay out the bases, base paths and pitcher's mound of baseball or softball diamond. This embodiment of the tool, which will herein be referenced generally as 400, comprises a cord 402 having a specific measured length for forming a pattern having the size and shape of a baseball diamond. Preferably, the cord 402 is resistant to stretching so that the pattern is dimensionally stable. A plurality of anchoring points 404 may be spaced along the length of the cord 402. Anchoring devices 406 may engage the cord 402 via each of the anchoring points 404 to secure the cord 402 to the ground. Preferably, the anchoring points 404 comprise loops formed in the cord 402 at specific pre-measured intervals along the cord 402. Similarly, the anchoring devices 408 preferably comprise stakes which may be driven into the ground. Each of the loops may be placed around one of the stakes to secure the cord to the ground. Preferably, the anchoring points 404 may be spaced along the cord for locating the bases 410, home plate 412, and the pitcher's mound 414 of the baseball diamond. The cord 202 may also be used to lay the base paths which may then be marked with a chalk line. The cord 202 may then be removed so that the game may be played. A spool 416 may be attached to the cord 402, near one end thereof, for receiving the cord 402 and anchoring devices 406 so that the tool 400 may be self stowed.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for laying out a pattern of a measured size and orienting the pattern with respect to an exterior point of reference, said apparatus comprising:

a cord having a measured length for forming the pattern, said cord having a plurality of anchoring points spaced along its length;

a direction finding device attached to said cord, said direction finding device for orienting the pattern formed by said cord to a point of reference exterior to the pattern; and a plurality of anchoring devices, each of said plurality of anchoring devices for securing one of the plurality of anchoring points to the surface.

2. The apparatus of claim 1, further comprising a spool attached to said cord for receiving said cord wound thereon and for stowing said plurality of anchoring devices and said direction finding device.

3. The apparatus of claim 2, wherein the pattern is a rectangle and wherein each of the plurality of loops is positioned at one corner of the rectangle.

4. The apparatus of claim 3, wherein the plurality of anchoring points comprises a first loop, a second loop, a third loop, a fourth loop, a fifth loop and a sixth loop, the first loop and the second loop partitioning the cord into a long length, the third, forth, fifth and sixth loops partitioning the cord into four short lengths wherein each of the short lengths may be arrayed to form a side of the square and the long length may be arrayed to form a diagonal of the rectangle.

5. The apparatus of claim 4, wherein the direction finding device is fixed to the long length adjacent to the second loop.

6. The apparatus of claim 4, wherein the spool is fixed to a short length adjacent to the sixth loop.

7. The apparatus of claim 4, wherein the orienting means comprises means for orienting the pattern to magnetic north.

8. The apparatus of claim 1, further comprising a tag attached to said cord adjacent to each of the attachment points to identifying the attachment point.

9. The apparatus of claim 1, wherein each of the plurality of anchoring devices is a stake for anchoring the cord to the ground.

10. The apparatus of claim 9, wherein the non-magnetic material is selected from the group consisting of aluminum, brass, titanium, plastic, composite, and wood.

11. The apparatus of claim 1, wherein each of the plurality of anchoring devices is made from a non-magnetic material.

12. The apparatus of claim 1, wherein said direction finding device comprises a magnetic compass.

* * * * *